T. N. WILSON.
TROWEL.
APPLICATION FILED JUNE 22, 1916.

1,249,580.

Patented Dec. 11, 1917.

Witnesses:

Thomas N. Wilson, Inventor,
By ........., Atty.

UNITED STATES PATENT OFFICE.

THOMAS N. WILSON, OF PORTLAND, OREGON, ASSIGNOR OF ONE-HALF TO A. G. WHITMER, OF PORTLAND, OREGON.

TROWEL.

1,249,580.  Specification of Letters Patent.  Patented Dec. 11, 1917.

Application filed June 22, 1916. Serial No. 105,153.

*To all whom it may concern:*

Be it known that I, THOMAS N. WILSON, a citizen of the United States, residing in the city of Portland, county of Multnomah, and State of Oregon, have invented certain new and useful Improvements in Trowels, of which the following is a specification.

My invention relates to further improvements in trowels of the character shown and described in my United States Patent 1,003,388, issued September 12, 1911. In the invention as shown and described in that patent, my handle is adjustably held in position by means of an eccentric lever, whereby the locking strain is exerted downwardly on the blade of the trowel, with a pull upwardly on the bar, or bead, of the blade, tending to pull the bar, or bead, from the trowel.

The object of my present invention is to provide an improved means for adjustably and detachably clamping the handle to the blade, whereby the handle is clamped to the bead, without any strain on the blade itself.

In order that others may understand my invention, I have illustrated the same in the accompanying sheet of drawings, which I will now describe.

Figure 3:
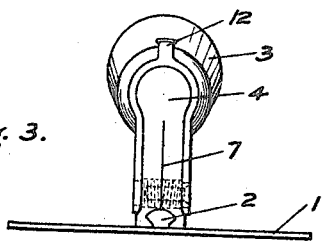
Fig. 3 is a front end view thereof.
Figure 2:
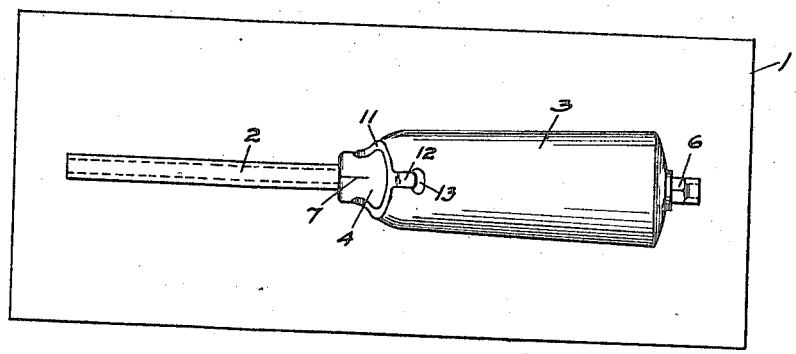
Fig. 2 is a top plan view thereof.
Figure 4:
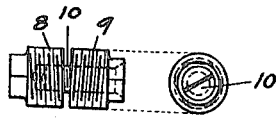
Fig. 4 shows a detail of a right and left hand screw for clamping the handle to the blade bar, or bead.

Referring now to the drawings, 1 designates the trowel blade, provided on its upper surface with a bead, or bar, 2. A handle 3, is provided with a body 4, secured to the handle by means of a bolt 5, extending lengthwise therethrough, and provided with a nut 6. Said body 4, is adapted to straddle over the bead, or bar, 2, in the manner clearly indicated in the drawings, and to this end is split, as indicated at 7, so that the sides thereof can be moved apart, or brought together in a way to clamp around the opposite sides of the bar, or bead, 2. The two parts of the body 4, are drawn together and moved apart by means of two screw nuts 8 and 9, provided, respectively, with right and left hand threads, and each being screwed on to an inner screw 10, as clearly illustrated in Fig. 4. The screw nuts 8 and 9, are operated by means of an operating yoke, or lever, 11, the lower ends of which are attached to the opposite ends of said screw nuts, so as to turn them together on the screw 10, when said yoke, or lever 11, is moved in one direction, and to move them apart thereon when said yoke, or lever, is moved in the opposite direction, as indicated in dotted lines, Fig. 1. Said yoke, or lever, 11, is adapted to be seated snugly into the end of the handle 3, as clearly indicated in Figs. 1, 2 and 3 of the drawings, and is provided with a lifting lip 12, by means of which said lever, or yoke, can be pushed outwardly in the position shown in dotted lines, Fig. 1, for the purpose of releasing the grip of the body 4, upon the bead, or bar, 2. To this end the handle 3, is provided with a slight indent 13, to facilitate engagement with the lip 12, of said yoke, or lever 11.

Figure 1:
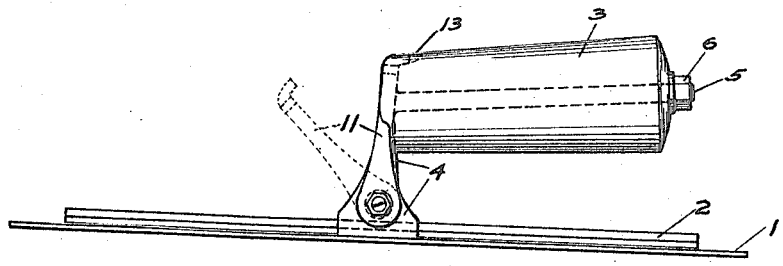
Figure 1 is a side elevation of a trowel embodying my invention.

Thus by moving the lever, or yoke, 11, outwardly, as shown in dotted lines, Fig. 1, the handle can be slid along the bar, or bead, 2, to any desired position, or can be wholly removed therefrom. Said handle can also be reversed on said blade, if desired, as when the end of the blade most used has become worn.

Thus it will be seen that with my improved means the handle can be firmly clamped around the bead, or bar, 2, of the blade without exerting any separating strain between the blade 1, and the bead 2, this being accomplished by means for drawing the clamping portions of the body 4, toward each other and locking them in clamping position.

What I claim is:

1. A trowel of the character shown and described, comprising in combination a blade provided on its upper surface with a longitudinally extending bead-like member, a handle having a body portion adapted to straddle over said bead-like member and to rest at its lower end squarely upon said blade at opposite sides of said bead-like member, a left and right hand screw mechanism connecting the parts of said body, and means forming a permanent part of said handle and connected with said screw mechanism for turning the same, whereby to draw the parts of said body in clamping engagement around the opposite sides of said bead-like member, substantially as described.

2. A trowel of the character shown and described, comprising a blade provided on its upper side with a longitudinally extending bead-like member, a handle having a body portion adapted to straddle over said bead-like member and to rest squarely upon said blade at opposite sides of said bead-like member, a screw provided with left and right hand screw nuts through said body and adapted to draw the parts of said body together into clamping engagement with the opposite sides of said bead-like member, and an operating yoke, or lever, connected to the opposite ends of said screw nuts, for turning the same, substantially as described.

Signed at Portland, Multnomah county, Oregon, this 16th day of June, 1916.

THOMAS N. WILSON.

In presence of—
I. M. Griffin,
A. G. Whitmer.

Copies of this patent may be obtained for five cents each, by addressing the "Commissioner of Patents, Washington, D. C."